United States Patent
Kalempa

(10) Patent No.: US 11,359,668 B2
(45) Date of Patent: Jun. 14, 2022

(54) ROLLER CONFIGURED TO SUPPORT A ROTARY MILKING PLATFORM

(71) Applicant: DELAVAL HOLDING AB, Tumba (SE)

(72) Inventor: Walenty Kalempa, Tumba (SE)

(73) Assignee: DeLaval Holding AB, Tumba (SE)

( * ) Notice: Subject to any disclaimer, the term of this patent is extended or adjusted under 35 U.S.C. 154(b) by 34 days.

(21) Appl. No.: 17/253,304

(22) PCT Filed: Jun. 14, 2019

(86) PCT No.: PCT/SE2019/050566
§ 371 (c)(1),
(2) Date: Dec. 17, 2020

(87) PCT Pub. No.: WO2019/245432
PCT Pub. Date: Dec. 26, 2019

(65) Prior Publication Data
US 2021/0270319 A1    Sep. 2, 2021

(30) Foreign Application Priority Data

Jun. 19, 2018  (SE) .................................... 1850747-5

(51) Int. Cl.
*F16C 19/50* (2006.01)
*A01K 1/12* (2006.01)
(Continued)

(52) U.S. Cl.
CPC ............ *F16C 19/507* (2013.01); *A01K 1/126* (2013.01); *F16C 13/006* (2013.01);
(Continued)

(58) Field of Classification Search
CPC ........ F16C 13/00; F16C 13/006; F16C 19/26; F16C 19/507; F16C 23/088; F16C 29/04;
(Continued)

(56) References Cited

U.S. PATENT DOCUMENTS 3,860,171 A * 1/1975 Mastronardi ............. E01B 9/02
238/148
4,723,852 A * 2/1988 Ehret ...................... F16C 41/02
384/593
(Continued)

FOREIGN PATENT DOCUMENTS

| CN | 105016202 | 11/2015 |
| CN | 204778400 | 11/2015 |
| GB | 2158017 | 11/1985 |

OTHER PUBLICATIONS

International Search Report for PCT/SE2019/050566 dated Sep. 13, 2019, 3 pages.
(Continued)

*Primary Examiner* — Phillip A Johnson
(74) *Attorney, Agent, or Firm* — Nixon & Vanderhye

(57) ABSTRACT

A roller is provided that is configured to support of a rotary platform. The roller includes at least one side flange including an inner surface, a rolling surface to be in contact with a flat running surface of an upper rail member fixedly connected to the rotary platform and a flat running surface of a lower rail member stationary arranged. The roller includes a circumferential recess connecting the rolling surface to the inner surface of the side flange and that the circumferential recess has a depth such that the flat running surfaces of the upper rail member and the lower rail members are out of contact with a bottom surface of the circumferential recess at a potential angle deviation between the flat running surfaces of the rail members and a rotation axis of the roller.

17 Claims, 3 Drawing Sheets

(51) Int. Cl.
*F16C 13/00* (2006.01)
*F16C 29/04* (2006.01)
*F16C 33/36* (2006.01)
*F16C 23/08* (2006.01)
*F16C 33/34* (2006.01)

(52) U.S. Cl.
CPC ............ *F16C 23/088* (2013.01); *F16C 29/04* (2013.01); *F16C 33/34* (2013.01); *F16C 33/363* (2013.01); *F16C 2300/14* (2013.01); *F16C 2310/00* (2013.01)

(58) Field of Classification Search
CPC ................ F16C 33/363; F16C 2300/14; F16C 2310/00; A01K 1/126
See application file for complete search history.

(56) References Cited

U.S. PATENT DOCUMENTS

| | | | | |
|---|---|---|---|---|
| 5,205,657 | A | * | 4/1993 | Feld ........................ B66C 23/84 384/618 |
| 5,782,738 | A | | 7/1998 | Bowers |
| 8,117,988 | B2 | * | 2/2012 | Oliver ..................... F16C 13/00 119/14.04 |
| 9,574,607 | B2 | * | 2/2017 | Strom ..................... F16C 33/34 |
| 2017/0030406 | A1 | | 2/2017 | Hellekant |

OTHER PUBLICATIONS

Written Opinion of the ISA for PCT/SE2019/050566 dated Sep. 13, 2019, 8 pages.
Search Report for SE 1850747-5 dated Jan. 2, 2019, 2 pages.

* cited by examiner

ROLLER CONFIGURED TO SUPPORT A ROTARY MILKING PLATFORM

This application is the U.S. national phase of International Application No. PCT/SE2019/050566 filed Jun. 14, 2019 which designated the U.S. and claims priority to SE Patent Application No. 1850747-5 filed Jun. 19, 2018, the entire contents of each of which are hereby incorporated by reference.

THE BACKGROUND OF THE INVENTION AND PRIOR ART

The present invention relates to a roller configured to support a rotary milking platform.

Conventional support arrangements for rotary milking platforms comprises rollers provided with a cylindrical rolling surfaces to be arranged between a flat running surface of an upper rail member connected to the rotary platform and a flat running surface of a stationary arranged lower rail member. The rollers provide a vertical support of the platform. Usually, the rollers comprise flanges. In this case, the rollers also provide a positioning of the platform in a horizontal plane. However, it is difficult to arrange the flat running surface of the upper rail member in a vertical position exactly above the flat running surface of the lower rail member. Furthermore, it is difficult to arrange the flat running surfaces surface of the upper rail member completely in parallel with the flat running surface of the lower rail member. An angular deviation between the flat running surfaces results in an uneven load on the rolling surface of the roller. A rotary milking platform supporting cows is very heavy and the load on the rollers is high. The rollers are many times manufactured by a plastic material such as a nylon material. It has been noted that the rolling surface and the flanges of the rollers are worn out relatively quickly especially in cases when the flat running surfaces are not exactly arranged in parallel and aligned in a vertical direction. It is difficult and time consuming to exchange worn out rollers supporting a rotary milking platform.

US 2017/0030406 shows a roller of a support arrangement for a rotary milking platform. The roller includes side flanges which are arranged on opposite sides of a rolling surface. The rolling surface of the roller is arranged in contact with a flat running surface of an upper rail member and a flat running surface of a lower rail member. The rolling surface of the roller comprises a convex portion and two beveled surfaces which are arranged at opposite sides of the convex portion. Two convex curved portion connect the beveled surfaces to a respective inner surface of flanges.

SUMMARY OF THE INVENTION

The object of the present invention is to provide a roller configured to support a rotary milking platform which has a design such that an improved life time is provided.

This object is achieved by the roller defined in claim 1. A roller for a rotary platform is subjected to large loads which results in stresses in the roller. Cracks and other kinds of deformations are usually initiated in areas with high stress concentration. In a conventional roller with flanges, the edge portion between the running surface of the roller and an inner surface of a flange is an area in which stress concentrations and damages are common. According to the present invention, said area is provided with a circumferential recess connecting the rolling surface to an inner surface of a side flange. The circumferential recess has a depth such that the flat running surfaces are out of contact with a bottom surface of the circumferential recess at a potential angle deviation between the flat running surfaces of the rail members and the rotation axis of the roller. The potential angle deviation between the flat running surfaces of the rail members and the rotation axis of the roller may be in the range of ±6 degrees. Angle deviations between the rolling surface of the roller and the flat running surfaces of the rail members above 6 degrees are very rare but it is of course possible to design the circumferential recess such that the edge portions of the flat running surfaces do not come in contact with the bottom surface of the circumferential recess at larger or smaller angular deviations range.

Since the flat running surfaces are out of contact with the bottom surface defining the circumferential recess, the flat running surfaces are not able to provide a load on the area of the roller provided with the circumferential recess. As a result, the stress concentration in this usually stress exposed area will be low which substantially eliminates the risk for deformations and crack formations. Furthermore, such a circumferential recess prevents that possible sharp edge portions of the flat running surfaces, damages the roller in this area. Thus, the present roller will obtain less stress concentrations and substantially no damages in said usually stress exposed area which results in a longer life time of the present roller in relation to a conventional roller.

According to an embodiment of the invention, the bottom surface of the circumferential recess has a curved concave shape in an axial direction from the rolling surface of the roller to the inner surface of the flange. A circumferential recess with such a design has no sharp edge portions in which stress concentrations can be formed. The bottom surface of the circumferential recess may have a circular shape in an axial direction from the rolling surface to the inner surface of the flange. In this case, the depth of the circumferential recess may correspond to the radius of the circle.

According to an embodiment of the invention, the circumferential recess has a width of 2 to 5 mm in an axial direction of the roller. The circumferential recess has to have a width such that it receives the edge portion of the flat running surfaces at a potential angular deviations between the roller and the flat running surfaces.

According to an embodiment of the invention, the inner surface of the flange forms an angle in relation to a plane perpendicular to the rotation axis of the roller. A contact portion of the rail members is usually designed with a rectangular cross section with side surfaces arranged on opposite sides of the flat running surface. At an angular deviation between a roller and a flat running surface of a rail member, there is a great risk that said side surfaces of the rail members comes in contact with the inner surface of the flange. Such a contact may results in damages of the flange. In any event, it will increase the rolling friction of the roller. The above mentioned design of the inner surface of the flange makes it is possible to avoid that a side surface to the flat rolling surface come in contact with the inner surface of the flange at relevant angle deviations between the flat running surfaces of the rail members and the roller.

According to an embodiment of the invention, the flange may form an angle in the range of 2 to 6 degrees to a plane perpendicular to the rotation axis of the roller. Usually, it is enough if the inner surface of the flange forms an angle of 4 degrees to a plane perpendicular to a rotation axis of the roller.

According to an embodiment of the invention, the rolling surface of the roller has a convex shape in an axial direction of the roller. The convex shape of the rolling surface allows for certain angular deviation between the roller and the flat running surfaces. Furthermore, the convex shape of the running surface ensures that the main load on the roller will be created on a central area of the running surface. The rolling surface of the roller may have a symmetric convex shape between the circumferential recesses. The rolling surface of the roller may have a circular shape in an axial direction of the roller with a radius of curvature in the range of 150 to 300 mm. Thus, the rolling surface has a relatively small curvature in the axial direction of the roller.

According to a further embodiment of the invention, the roller is manufactured of a material body in one piece. The roller may be a homogeneous body of a wear resistant material. Such a material may be a nylon material. Rollers made of a nylon have excellent impact resistance, good load capacity, good chemical resistance, low coefficient of friction, good vibration absorbing properties and they can be manufactured at a low cost.

According to a further embodiment of the invention, the roller comprises two side flanges and two circumferential recesses, connecting the rolling surface to a respective inner surface of the flanges. In this case, both flanges portions may have inclined inner surfaces. A contact portion of the respective rail members, which comprises the flat running surfaces and two side surfaces may be arranged in the axial space between the flanges.

According to a further embodiment of the invention, the roller comprises a centre hole configured to receive a non-rotatable shaft defining a rotation axis of the roller. In this case, the roller rotates around the non-rotatable shaft. Such a roller have a very simple design. In this case, the ends of the shaft have fixed connections to suitable components arranged on opposite sides of the roller. The centre hole may be configured to receive a shaft connecting the roller to elongated connection element arranged on opposite sides of the rollers. Such connection elements may constitute a connection between several rollers in a support arrangement for the platform. The connection elements may have an extension such that they connect all rollers or a group of rollers to each other. Preferably, the rollers are arranged at constant intervals along a path defined by the flat running surfaces of the circular rail members.

BRIEF DESCRIPTION OF THE DRAWINGS

The present invention is now to be explained more closely by means of preferred embodiments, which are disclosed as examples, and with reference to the attached drawings.

BRIEF DESCRIPTION OF PREFERRED EMBODIMENTS OF THE INVENTION

Figure 1:
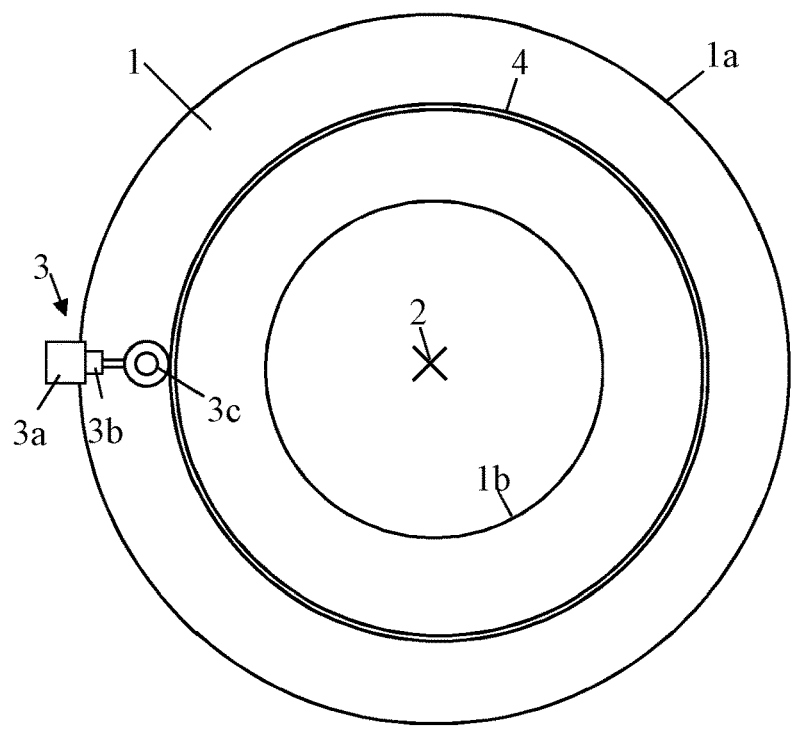
FIG. 1 shows a view of a schematically indicated rotary milking platform from the below.

FIG. 1 shows, from the below, a rotary annular platform 1 for milking of cows. The platform 1 is rotatably arranged around a vertical axis 2. The annular platform 1 has an outer edge portion 1a and an inner edge portion 1b. The platform 1 is driven by a drive unit 3. The drive unit 3 comprises an electric motor 3a, an integrated reduction gear box 3b and a drive wheel 3c mounted in contact with a side surface of an upper circular rail member 4 fixedly attached to the platform 1. The drive wheel 3c may be a pneumatic tyre. Such a drive wheel 3c makes the drive unit shock resistant as the tyre provides a cushioning effect. The drive unit 3 has a smooth start and stop action. The drive unit 3 may be infinitely variable in speed in either a clockwise or counter-clockwise direction. The upper circular rail member 4 is fixedly attached to a lower surface of the platform 1 by, for example, welding.

Figure 2:
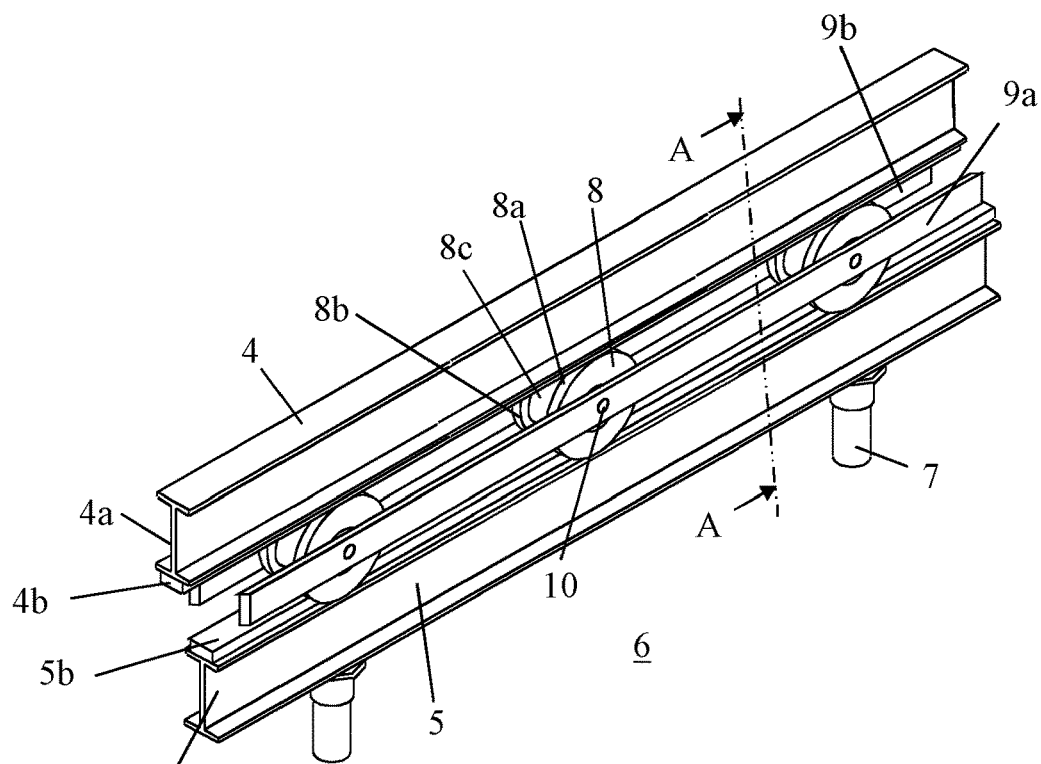
FIG. 2 shows a perspective view of a part of a support arrangement for a platform provided with rollers according to the invention.

FIG. 2 shows a part of a support arrangement for the platform 1. The upper rail member 4 comprises an I-shaped beam 4a and a contact portion 4b. The contact portion 4b may be welded to a lower surface of the I-shaped beam 4a. The support arrangement comprises further a lower circular rail member 5 to be arranged vertically below the upper rail member 4. The lower circular rail member 5 is arranged on a stationary surface 6 by means of a suitable number of support legs 7. The lower rail member 5 also comprises an I-shaped beam 5a and a contact portion 5b mounted on an upper surface of the I-shaped beam 5a. The contact portion 5b may be welded to the I-shaped beam 5a.

The support arrangement comprises further a number of rollers 8 arranged in a vertical space between the upper rail member 4 and the lower rail member 5. Each roller 8 is provided with a first side flange 8a, a second side flange 8b and a rolling surface 8c arranged between the side flanges 8a, 8b. A first elongated connection element 9a and a second elongated connection element 9b are arranged on opposite sides on the rollers 8. The connection elements 9a, 9b have a corresponding circular extension as the rail members 4, 5. The connection elements 9a, 9b are provided with holes at constant intervals. The rollers 8 are rotatably arranged around bolts 10 arranged in said holes. The distance between two adjacent holes of the elongated connection elements 9a, 9b defines the distance between two adjacent rollers 8.

Figure 3:
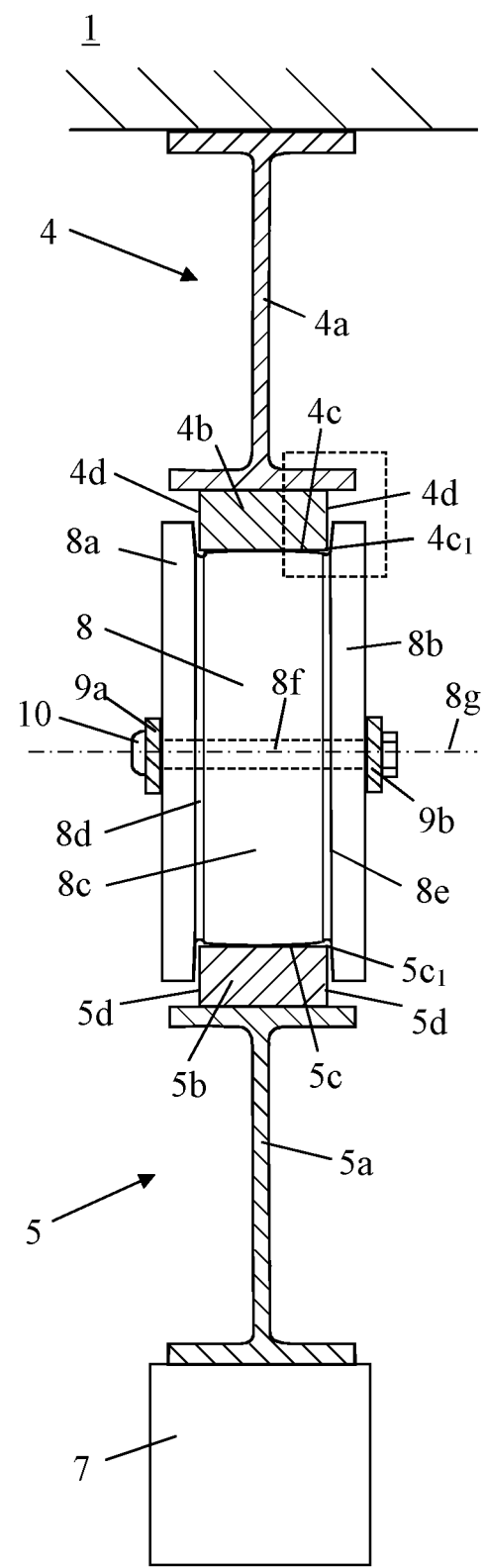
FIG. 3 shows a sectional view of the support arrangement in FIG. 2 in the plane A-A and FIG. 4a-4b shows the marked area in FIG. 3 more in detail.

FIG. 3 shows a cross section view along plane A-A in FIG. 2. The contact portion 4b of the upper rail member 4 has a rectangular cross section area. A part of the contact portion 4b is arranged in the axial space between the flanges 8a, 8b of the roller 8. The contact portion 4b comprises a flat running surface 4c to be in contact with the rolling surface 8c of the roller 8 and side surfaces 4d of the contact portion 4b which form a right angle to the running surface 4c. The contact portion 4b comprises square corners defining edge portions $4c_1$ of the running surface 4c. In a corresponding manner, the contact portion 5b of the lower rail member 5 has a rectangular cross section area. A part of the contact portion 5b is arranged in the axial space between the flanges 8b, 8c of the roller 8. The contact portion 5b comprises a flat running surface 5c to be in contact with the rolling surface 8c of the roller 8 and side surfaces 5d of the contact portion 5b which form a right angle to the running surface 5c. Thus, the side edges $5c_1$ of the running surface 5c are defined by square corners.

The rollers 8 may be manufactured by a material body in one piece. The material may be a nylon material. Such a material has suitable properties for supporting a heavy rotary platform 1. However, it is possible to manufacture the rollers 8 of other materials. Furthermore, the rollers 8 may comprises different materials in different parts. The rolling surface 8c of the roller 8 may have a diameter of about 150 to 200 mm, preferably 170 mm. The diameter of the flanges may be about 170 to 230 mm, preferably 200 mm. The rolling surface 8c has an axial length of about 40 to 55 mm, preferably 47 mm and a relatively small convex curved shaped in an axial direction with a radius of curvature of about 150 to 300 mm, preferably 210 mm. The convex curved shape of the rolling surface 8c results in that the roller 8 is able to form an angle in relation to the flat running surfaces 4c, 5c of the rail members 4, 5. The roller 8 comprises a first circumferential recess 8d connecting the rolling surface 8c to the first flange 8a and a second circumferential recess 8e connecting the rolling surface 8c to the second flange 8b. The roller 8 comprises a centrally arranged through hole 8f that extends in an axial direction through the roller 8. The through hole 8f defines a rotation axis 8g of the roller 8.

During rotation of the platform 1, the side flanges 8a, 8b prevent side movements of the upper rail member 4 and the platform 1 in relation to the rolling member 8 and the stationary lower rail member 5. The side flanges 8a, 8b position the upper rail member 4 substantially vertically above the lower rail member 5 and the platform 1 in a horizontal plane such that it rotates around the fixed vertical axis 2. The roller 8 is rotatably arranged around a non-rotatable shaft in the form of the centre bolt 10. The centre bolt 10 has a head arranged outside the first elongated connection element 9a. The centre bolt 10 has an elongated body extending through a hole in the first elongated connection element 9a, the through hole 8f in the roller 8 and a hole in the second elongated connection element 9b. The centre bolt 10 is fastened by means of a nut 11 or the like on the outside of the second elongated element 9b.

Figure 4A:
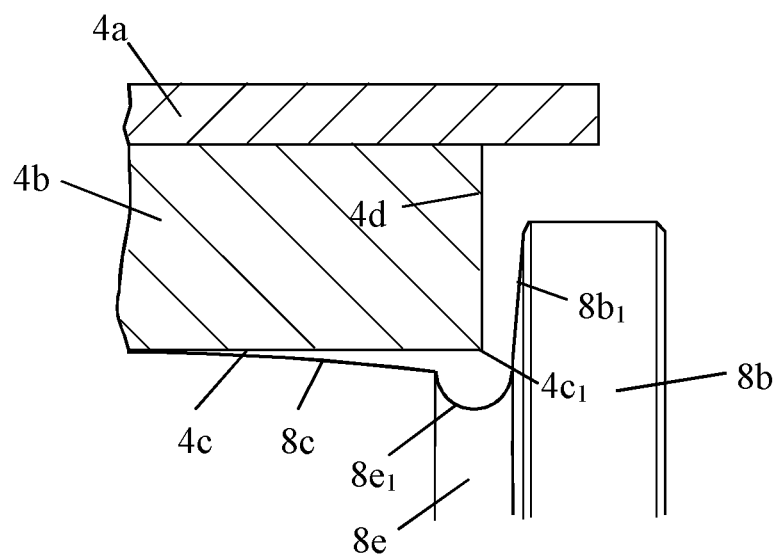
Figure 4B:
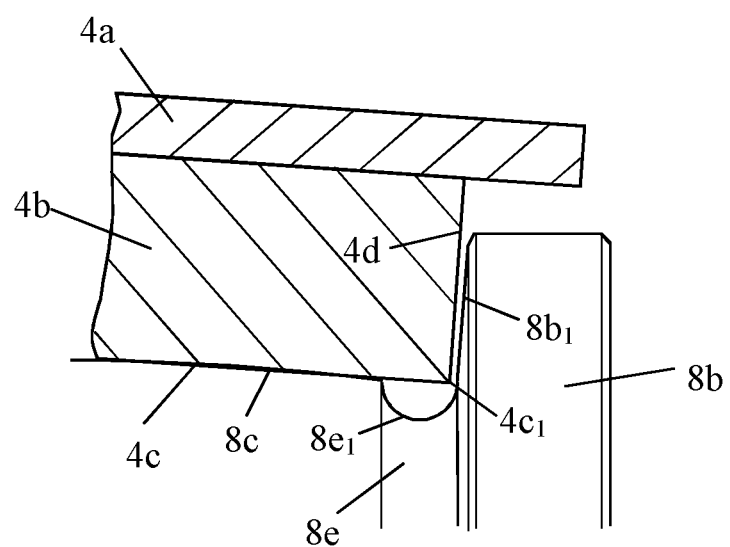

FIGS. 4a and 4b show the marked area in FIG. 3 more in detail. FIG. 4a shows the flat running surface 4c and the rolling surface 8c of the roller 8 when there is no angular deviation between them and FIG. 4b shows the flat running surface 4c and the rolling surface 8c of the roller 8 when there is an angular deviation of about 4 degrees between them. It is here visible that the circumferential recess 8e has a bottom surface $8e_1$ with circular shape having an extension in an axial direction from the rolling surface 8c to the inner surface $8b_1$ of the flange 8b. The circumferential recess 8e has a radius in the range of 1 to 3 mm, preferably 1, 6 mm. In this case, the largest depth of the circumferential recess 8e corresponds to the radius of the circle. In any event, the circumferential recess 8e has a depth such that the edge portion $4c_1$ of the flat running surfaces 4c is out of contact with the bottom surface $8e_1$ of the circumferential recess 8e at potential angular deviation between the roller 8 and the flat running surfaces 4a of the upper rail member 4.

Since the flat running surface 4c is not able to come in contact with the bottom surface $8e_1$, the flat running surface 4c is not able to provide a load on the area occupied by the circumferential recess 8e. This means that substantially no stress concentrations will be formed in this area of the roller 8 which normally is exposed for a large stress concentration. Furthermore, the depth of the circumferential recess 8e prevents that the sharp edge portion $4c_1$ of the flat running surface 4c does not come in contact with the bottom surface $8e_1$ of the circumferential recess 8e which means that the sharp edge portions $8c_1$ is not able to damage the bottom surface $8e_1$ or increase the rolling friction of the roller 8.

Furthermore, the inner surface $8b_1$ of the flange 8b forms an angle of about 4 degrees in relation to a plane perpendicular to the rotation axis 8g of the roller 8. In view of that fact, an angular deviation up to 4 degrees between the flat running surface 4c and the roller 8, results in that the side surface 4d does not come in contact with the inner surface $8b_1$ of the flange 8b. Such a design of the inner surface $8b_1$ of the flange 8b makes it possible to avoid that the side surface 4d of the contact portion 4b comes in contact with the inner surface $8b_1$ of the flange 8b when said side surface 4d forms an angle up to 4 degrees in relation to a plane perpendicular to a rotation axis 8g of the roller 8.

The invention is not restricted to the described embodiment in the figures, but may be varied freely within the scope of the claims.

The invention claimed is:

1. A roller configured to support a rotary platform, the roller comprising:
   at least one side flange comprising
      an inner surface,
      a rolling surface configured to be in contact with a flat running surface of an upper rail member fixedly connected to the rotary platform and a flat running surface of a stationary lower rail member; and
   at least one circumferential recess connecting the rolling surface to the inner surface of the side flange, the at least one circumferential recess having a depth and being configured such that a bottom surface of the at least one circumferential recess is out of contact with the flat running surfaces of the upper and lower rail members at an angle deviation between the flat running surfaces of the upper and lower rail members and a rotation axis of the roller, when the rolling surface is in contact with the flat running surfaces of the upper rail member and the stationary lower rail member.

2. The roller according to claim 1, wherein the bottom surface of the at least one circumferential recess has a curved concave shape in an axial direction from the rolling surface to the inner surface of the flange.

3. The roller according to claim 2, wherein the at least one circumferential recess has a circular shape in the axial direction from the rolling surface to the inner surface of the flange.

4. The roller according to claim 1, wherein the at least one circumferential recess has an axial width of 2 to 5 mm.

5. The roller according to claim 1, wherein the inner surface of the flange forms an angle in relation to a plane perpendicular to the rotation axis of the roller.

6. The roller according to claim 5, wherein the inner surface of the flange forms an angle in the range of 2 to 6 degrees in relation to the plane perpendicular to the rotation axis of the roller.

7. The roller according to claim 1, wherein the rolling surface has a convex shape in an axial direction of the roller.

8. The roller according to claim 7, wherein the rolling surface has a circular convex shape in the axial direction of the roller with a radius of curvature in the range of 200 to 400 mm.

9. The roller according to claim 1, wherein the roller is manufactured of a material body in one piece.

10. The roller according to claim 9, wherein the roller is a nylon material.

11. The roller according to claim 1, wherein the roller comprises two of said at least one side flange and two of said at least one circumferential recess, the two side flanges being disposed on opposite sides of the rolling surface and the two circumferential recesses connecting the rolling surface to a respective inner surface of the flanges.

12. The roller according to claim 1, further comprising a central through hole defining the rotation axis of the roller.

13. The roller according to claim 12, wherein the central through hole is configured to receive a shaft connecting the roller to two connection elements connecting the roller to adjacent rollers.

14. A supporting arrangement of a rotary platform comprising:
   the roller according to claim 1.

15. The roller according to claim 1, wherein the at least one circumferential recess has radius of 1 to 3 mm.

16. The roller according to claim 15, wherein the at least one circumferential recess has radius of 1.6 mm.

17. A roller configured to support a rotary platform, the roller comprising:
   at least one side flange comprising
      an inner surface,
      a rolling surface configured to be in contact with a flat running surface of an upper rail member fixedly connected to the rotary platform and a flat running surface of a stationary lower rail member; and
   at least one circumferential recess connecting the rolling surface to the inner surface of the side flange, the at least one circumferential recess having a depth in relation to the rolling surface and being configured to receive the flat running surfaces of the upper and lower rail members within the at least one circumferential recess without the flat running surfaces contacting a bottom surface of the at least one circumferential recess at an angle deviation between the flat running surfaces of the upper and lower rail members and a rotation axis of the roller, such that side surfaces of the upper rail member and the lower rail member are prevented from coming in contact with the inner surface of the at least one side flange, when the rolling surface is in contact with the flat running surfaces of the upper rail member.

* * * * *